United States Patent …

(12) United States Patent
Sauzede et al.

(10) Patent No.: US 9,600,397 B2
(45) Date of Patent: Mar. 21, 2017

(54) DYNAMIC DEBUGGING METHOD OF A SOFTWARE MODULE AND CORRESPONDING DEVICE

(71) Applicant: STMicroelectronics (Grenoble 2) SAS, Grenoble (FR)

(72) Inventors: Nicolas Sauzede, Echirolles (FR); Alexandre Nabais, Le Gua (FR); Florian Guillochon, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 52 days.

(21) Appl. No.: 14/467,270

(22) Filed: Aug. 25, 2014

(65) Prior Publication Data

US 2015/0067655 A1   Mar. 5, 2015

(30) Foreign Application Priority Data

Aug. 29, 2013   (FR) .................................... 13 58260

(51) Int. Cl.
  *G06F 9/44*    (2006.01)
  *G06F 11/36*   (2006.01)
  *G06F 9/445*   (2006.01)

(52) U.S. Cl.
  CPC ........ *G06F 11/362* (2013.01); *G06F 9/44521* (2013.01)

(58) Field of Classification Search
  CPC .................................................... G06F 11/362
  USPC ........................................................ 717/127
  See application file for complete search history.

(56) References Cited

U.S. PATENT DOCUMENTS

| | | | |
|---|---|---|---|
| 5,394,544 A | 2/1995 | Motoyama et al. | |
| 7,725,888 B2 | 5/2010 | Yodaiken et al. | |
| 7,818,623 B2 | 10/2010 | Sengupta et al. | |
| 2003/0028860 A1* | 2/2003 | Sumida | G06F 11/3628 717/125 |
| 2004/0083331 A1 | 4/2004 | Gschwind et al. | |
| 2004/0098639 A1 | 5/2004 | Liu | |
| 2005/0216895 A1* | 9/2005 | Tran | G06F 11/362 717/127 |
| 2006/0069959 A1* | 3/2006 | Schultz | G06F 11/3644 714/35 |
| 2012/0005445 A1 | 1/2012 | Escandell et al. | |
| 2012/0124556 A1* | 5/2012 | Tong | G06F 11/362 717/124 |

OTHER PUBLICATIONS

Corbet et al. "Linux Device Drivers" Feb. 2005, O'Reilly Media, 3rd Edition, Downloaded Dec. 9, 2015 from <free-electrons.com/doc/books/ldd3.pdf>.*

(Continued)

*Primary Examiner* — James D Rutten
(74) *Attorney, Agent, or Firm* — Slater Matsil, LLP

(57) ABSTRACT

When a module is loaded by the operating system kernel, dynamic information of the module, such as the memory addresses of the different sections of the module allocated by the operating system, is stored in a known variable, which is subsequently accessible by the debugging tool. Furthermore, an interrupt instruction that will allow the debugger to interrupt the running of the operating system following the complete loading of the module is inserted into the debugging tool in such a way as to retrieve the dynamic information necessary for the debugging of the module.

25 Claims, 2 Drawing Sheets

(56) References Cited

OTHER PUBLICATIONS

Bendersky, "How debuggers work: Part 3—Debugging information", Feb. 7, 2011, published online at <http://eli.thegreenplace.net/2011/02/07/how-debuggers-work-part-3-debugging-information/>, accessed Mar. 31, 2016 at <https://web.archive.org/web/20110209135232/http://eli.thegreenplace.net/2011/02/07/how-debuggers-work-part-3-debugging-information/>.*

Tegawendé F. Bissyandé, Laurent Réveillère, Julia L. Lawall, and Gilles Muller. 2012. Diagnosys: automatic generation of a debugging interface to the Linux kernel. In Proceedings of the 27th IEEE/ACM International Conference on Automated Software Engineering (ASE 2012). ACM, New York, NY, USA, 60-69. DOI=http://dx.doi.org/10.1145/2351676.2351686.*

"Chapter 4: Debugging Techniques," Linux Device Drivers, 3rd Edition, Feb. 2005, 34 pages.

\* cited by examiner

DYNAMIC DEBUGGING METHOD OF A SOFTWARE MODULE AND CORRESPONDING DEVICE

This application claims the benefit of French Application No. 1358260, filed on Aug. 29, 2013, which application is hereby incorporated herein by reference.

TECHNICAL FIELD

The invention relates to the debugging of a software module and, in particular embodiments, to the dynamic debugging of modules loaded by the kernel of an operating system, for example, drivers of peripherals such as printers.

BACKGROUND

A debugging tool or debugger is a software program that helps a developer to analyze the malfunctions (bugs) of a program. Generally, the program to be debugged is run via the debugger and runs normally. The debugger then offers the programmer the facility to control the running of the program by allowing him by various means to stop a program-running step and observe, for example, the content of the different variables in the memory. The running step may then be observed, for example, in order to determine the cause of a fault.

Currently, for the dynamic debugging of a module loaded by the kernel of an operating system, it is necessary to perform the following operations manually during the running. The operating system kernel is booted and the debugging tool is connect. The module to be debugged is loaded. Each module will then be loaded at a dynamic memory address by the operating system. This memory address is not known in advance and can vary. (This is the reason why the term "dynamic debugging" is used.) The operating system kernel is interacted with in order to obtain the list of the sections/memory addresses of the module. The symbols associated with these sections are supplied to the debugging tool.

Once these steps have been carried out, the debugging of the module with all its symbols (binary code and data) can be carried out.

One problem is that the file relating to the module present on the hard disk does not contain any dynamic information such as the loading addresses of the different sections of the module allocated by the operating system.

This then means that this information necessary for the debugging must be obtained manually during the running, which requires specific knowledge of the operating system kernel, which may be complex, and which entails communication exchanges between the debugging tool and the memory of the operating system, which may be time-consuming.

Furthermore, the returned memory address is generally that of the main section of the module. Thus, if one or more variables are located in other sections of the module, they cannot be observed during the debugging.

Furthermore, when a module is loaded, the debugging of the module is currently based on the principle that the loading of the module has been successful. However, in the opposite case, an initialization function (Init) may reveal a malfunction (bug). Furthermore, no information on this "Init" function is available during the loading.

SUMMARY

According to one embodiment, a debugging method and device are proposed which allow the debugging tool to have access very quickly to the dynamic information necessary to carry out the debugging, including the information relating to all the sections of a module and possibly the information relating to the initialization functions (Init).

According to one embodiment, it is thus proposed to modify the operating system kernel and to use conventional debugging commands. More precisely, the part of the code allocated to the loading of the module can be modified in such a way as to store all the dynamic information of the module, such as the memory addresses of the different sections of the module allocated by the operating system when the module is loaded, in a known variable, subsequently accessible by the debugging tool. A software modification of this type can easily be carried out by the person skilled in the art and is minimal. Furthermore, an interrupt instruction which will enable the debugger to interrupt the running of the operating system following the complete loading of the module is inserted into the debugging tool in such a way as to retrieve the dynamic information necessary for the debugging of the module.

Thus, according to one aspect, a method is proposed for the dynamic debugging of at least one external software module intended to be loaded in a memory of a computer system by a loading block of the operating system kernel of the computer system.

The method according to this aspect includes an interworking of a debugging software tool with the operating system kernel. The debugging tool receives, as input data, identification information of the at least one external software module and also the binary code and the associated symbols of the external software module. The debugging tool also comprises an interrupt instruction attached to the identification information and to a current instruction from the heart of the operating system executable following the complete loading of the external software module. This current instruction may be any instruction that is executable once the loading of the module has been carried out.

The method according to this aspect also includes a storage by the heart of the operating system, when the external module is loaded, of the memory address of each section of the external module allocated by the loading block and of the identifier of said section in a memory, for example the program memory.

The method also includes, on the occurrence of the current instruction (in which the running of the operating system will be stopped), a retrieval by the debugging tool of the memory address and the identifier of each section of the external software module, and a supply by the debugging tool for each section of its binary code and the associated symbol files (for example the symbols PRINT, START, INIT, etc.).

At this stage, the developer can thus easily debug the external software module.

According to a different aspect, a device is proposed. A computer system is equipped with an operating system including a kernel comprising a loading block configured to load at least one external software module into a memory of a computer system. A debugging software tool is suitable for interworking with the operating system kernel for the dynamic debugging of the at least one external software module. The debugging tool has an input to receive identification information of the at least one external software module and also the binary code and associated symbols of the external software module, and comprises an interrupt instruction attached to the identification information and to a current instruction from the heart of the operating system executable following the complete loading of the external software module.

The kernel is further configured, when the external module is loaded, to store in a memory the memory address of each section of the external module allocated by the loading block and the identifier of said section. The debugging software tool is further configured, on the occurrence of the current instruction, to retrieve the memory address and the identifier of each section of the external software module and to supply, for each section, its binary code and the associated symbol file.

According to a different aspect, a dynamic debugging tool belonging to the device as defined above is also proposed.

BRIEF DESCRIPTION OF THE DRAWINGS

Other advantages and characteristics of the invention will become evident from the detailed description of embodiments, which are in no way limiting, and the attached drawings, in which.

DETAILED DESCRIPTION OF ILLUSTRATIVE EMBODIMENTS

Figure 1:
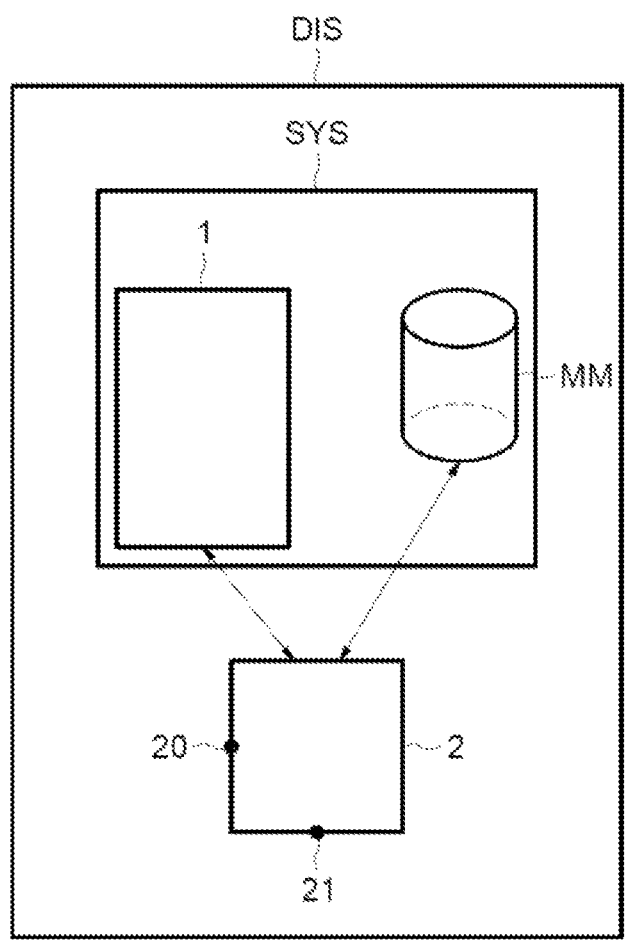
FIG. 1 shows schematically an embodiment of a device according to the invention.

In FIG. 1, the device DIS comprises a computer system SYS, for example a host computer containing an operating system 1, for example the Linux operating system, and also, in particular, a program memory MM in which an external software module, for example a driver of a peripheral such as a printer, is intended to be loaded by the operating system kernel.

The device DIS also comprises a debugging software tool 2, for example the debugger known by the name of GNU debugger, also referred to as GDB, which operates using a plurality of programming languages such as, for example, the C language or the C++ language. GDB is open-source software distributed under the license GNU GPL.

The debugging tool GDB operates on many different processor architectures and allows the remote debugging (via a serial link or Internet connection) of software modules running on a target platform separate from the development platform.

The debugging tool GDB therefore allows, in particular, a program to be debugged when it is running.

The debugging tool 2 comprises an input 20 to receive input parameters, for example binary codes and associated symbol files of the different sections of the external software module to be loaded, and an output 21.

Figure 2:
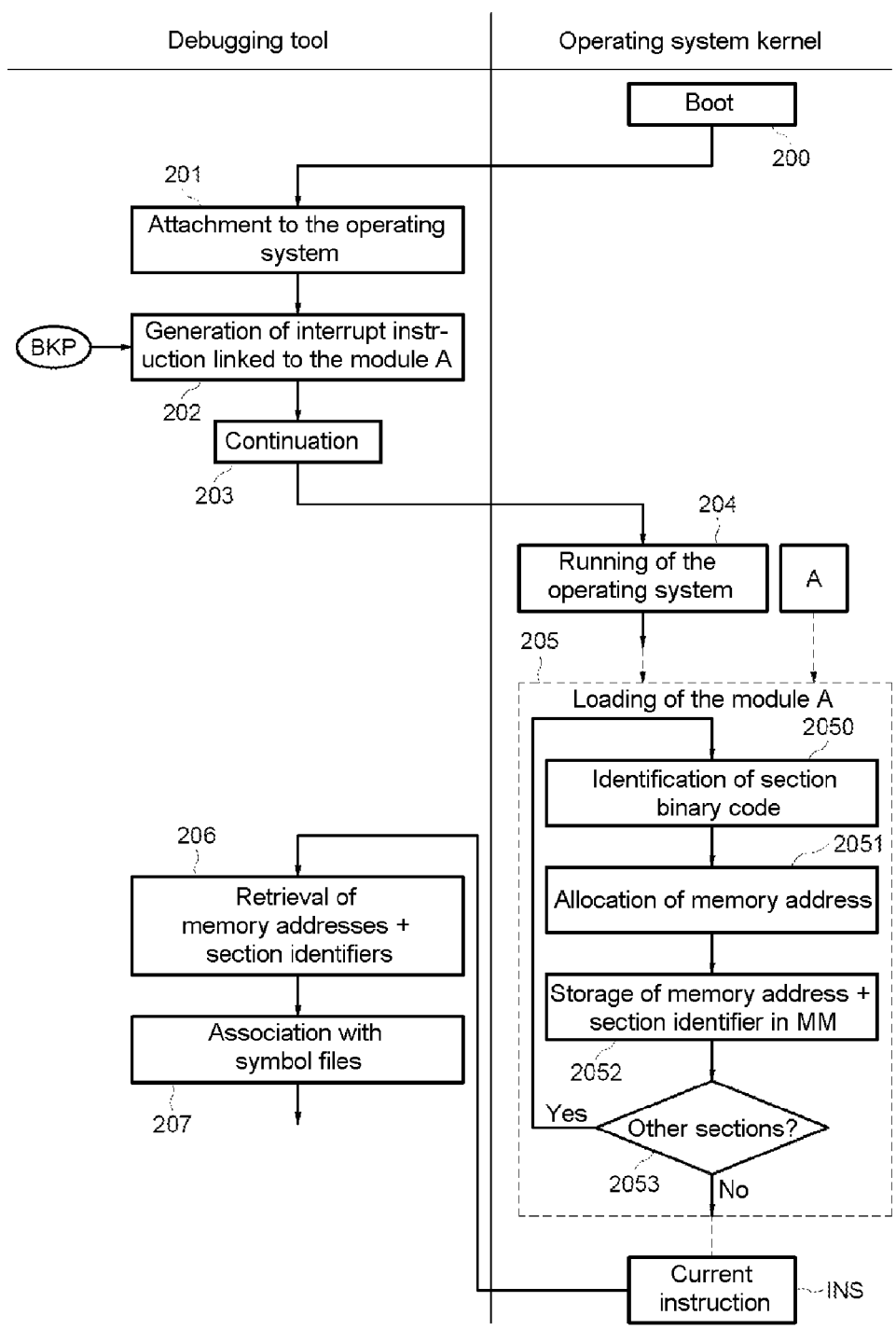
FIG. 2 shows schematically an embodiment of a debugging method according to the invention.

Reference is now made more particularly to FIG. 2 to illustrate an embodiment of the debugging method according to the invention in which an external software module A must be loaded by the operating system kernel to then be debugged by the debugging tool.

In a first step, the operating system kernel is booted 200 and a connection or attachment 201 of the debugging tool to the operating system is effected. After the launching of the debugging tool, this attachment can be effected, for example, by the "attach" command followed by the number of the program currently operating.

The debugging tool has furthermore been modified by the generation 202 of an interrupt instruction BKP linked to the module A and to a current instruction INS of the operating system, executable after the complete loading of the module A by the operating system kernel.

This current instruction INS is therefore disposed in the operating system after a module-loading block 205, the function of which is to load the external software module A into the memory MM.

The interrupt instruction BKP linked to the module A and to the current instruction INS may, for example, be an instruction of the following type:

BKP INS module A.

In this instruction, "module A" is information identifying the module A.

This type of interrupt instruction, the syntax of which explained here is specific to the debugging tool GDB, will allow the running of the operating system to be stopped when the instruction INS occurs and will allow the debugging tool to take control.

A continuation instruction 203 can then be disposed after the interrupt instruction. An instruction of this type is, for example, the "continue" instruction, which will allow the operating system to continue its running 204.

At a given time during this running, the module A will be loaded by the loading block 205.

This loading function comprises notably an identification 2050 of the binary code of a first section of the module A, then an allocation 2051 of a memory address to this section.

The loading module then stores (step 2052) the memory address thus allocated by the operating system kernel, and also the identifier of the section concerned in a memory which may, for example, be a part of the program memory MM, without this example being limiting.

Generally, a module comprises a plurality of sections. The possible presence of another section is tested (step 2053) and, if so, steps 2050 to 2052 are repeated.

The different memory addresses and identifiers of the different sections of the module have, for example, been stored within a predetermined variable (a table, for example) within the memory MM.

In the absence of any new section, it is considered that the loading block has completed the loading of the module concerned and the running of the operating system continues normally until the occurrence of the current instruction INS which will constitute a "breakpoint".

When the current instruction INS occurs, the debugging tool resumes control and then retrieves the memory addresses and the identifiers of the different sections of the module A from the memory MM (step 206). Given that it has binary codes and associated symbol files of the different sections of the module A as input parameters (received on its input 20), it retrieves the binary codes of the different sections stored in the program memory by the operating system kernel using the retrieved memory addresses and identifiers and then performs an association 207 between these different binary codes and the associated symbol files. These different binary codes and the associated symbol files are supplied by the debugging tool on its output 21.

At this time, the developer has all the elements to perform a debugging of the software module using conventional debugging commands.

An example is considered which entails the loading by the Linux kernel of 37 modules during its running, two of which have a size in the order of 2 Megabytes.

With a conventional debugging technique, the time required for the remote retrieval of the debugging information is in the order of some 35 minutes, whereas this time is reduced to around 3 and a half minutes with the method according to the invention.

The invention is not limited to the embodiments which have just been described, but encompasses all variants thereof.

Thus, other types of operating systems could be used instead of the LINUX operating system, such as, for example, BSD, RTOS and, more generally, any operating system with an available source and loading of dynamic modules such as drivers.

Similarly, other types of debugging tools can be used, such as, for example, CADI, CDI, TRACE 32 and, more generally, any debugging tool with a standardized remote connection.

What is claimed is:

1. A method for dynamic debugging of an external software module, the method comprising:
   modifying a loading block of an operating system of a computer system to store in a predetermined variable a memory address and an identifier of each section of the external software module;
   loading the external software module into a first memory section of a program memory of the computer system by the loading block;
   attaching an interrupt instruction to an identifier and to a current instruction from the operating system, the interrupt instruction executable following loading of the external software module;
   storing, by the operating system when the external software module is loaded, the memory address of each section of the external software module allocated by the operating system and the identifier of each section in the predetermined variable in a second memory section of the program memory;
   when the current instruction occurs, retrieving from the predetermined variable the memory address and the identifier of each section of the external software module by a debugging tool, the debugging tool receiving binary code and associated symbol files of the external software module; and
   providing, by the debugging tool, the binary code and associated symbol files for each section of the external software module.

2. The method according to claim 1, wherein the external software module comprises a driver.

3. The method according to claim 2, wherein the predetermined variable comprises a table, and the driver comprises a print driver.

4. The method according to claim 1, further comprising using the binary code and the associated symbol file for each section to debug the external software module.

5. The method according to claim 1, wherein the operating system comprises a Linux operating system.

6. The method according to claim 1, wherein the debugging tool comprises a GNU debugger.

7. The method according to claim 1, wherein attaching the interrupt instruction to the identifier and to the current instruction occurs before loading the external software module into the first memory section.

8. A computer system comprising:
   a processor;
   a first memory storage region coupled to the processor and storing an operating system that includes a kernel configured to load an external software module into a program memory of the computer system;
   a second memory storage region coupled to the processor and storing a debugging software tool configured to interwork with the operating system kernel for dynamic debugging of the external software module, the debugging software tool configured to receive identification information from the external software module and also binary code and associated symbols of the external software module, and comprising an interrupt instruction attached to the identification information and to a current instruction from a heart of the operating system executable when loading of the external software module is successful;
   wherein the debugging software tool is further configured, when loading of the external software module is unsuccessful, to output at least one of binary code or an associated symbol file for an initialization function of the external software module;
   wherein the kernel is further configured, when loading of the external software module is successful, to store, in a predetermined variable in the program memory, a memory address of each section of the external software module allocated by the kernel and an identifier of that section; and
   wherein the debugging software tool is further configured, when the current instruction occurs, to retrieve from the predetermined variable the memory address and the identifier of each section of the external software module and to provide, for each section, its binary code and its associated symbol file.

9. The system according to claim 8, wherein the debugging software tool is further configured to modify a loading block of the operating system to store in the predetermined variable the memory address and the identifier of each section of the external software module, and the external software module comprises a driver.

10. The system according to claim 9, wherein the predetermined variable comprises a table, and the driver comprises a print driver.

11. The system according to claim 8, wherein the operating system comprises a Linux operating system.

12. The system according to claim 8, wherein the debugging tool comprises a GNU debugger.

13. A debugging method comprising:
    modifying a loading block of a kernel of an operating system to store, in a predetermined variable in a program memory, a memory address and an identifier for a first section of an external software module;
    booting the operating system kernel;
    launching a debugging tool and effecting a connection or attachment of the debugging tool to the operating system;
    generating an interrupt instruction by the debugging tool, the interrupt instruction linked to the external software module and to a current instruction of the operating system;
    initiating a loading sequence for loading the external software module by the loading block, wherein initiating the loading sequence comprises identifying binary code of the first section of the external software module and then allocating the memory address of the program memory to this section;
    storing, by the operating system when loading sequence is initiated, the allocated memory address and the identifier of the first section in the predetermined variable in the program memory;
    when the loading sequence is successfully completed, running the operating system until an occurrence of the current instruction;
    when the current instruction occurs, retrieving, by the debugging tool from the predetermined variable, the stored allocated memory address and the identifier from the program memory and retrieving, by the debugging tool, the binary code of the first section stored in the program memory using the retrieved allocated memory address and the identifier; and when the current instruction occurs, performing an association between the binary code and an associated symbol file and outputting the binary code and the associated symbol file from the debugging tool.

14. The method according to claim 13, wherein the connection or attachment is effected by using an "attach" command followed by a number of programs currently operating.

15. The method according to claim 13, wherein the debugging tool comprises a GNU debugger.

16. The method according to claim 15, wherein the interrupt instruction comprises an instruction of the type: BKP INS module A, wherein "module A" comprises information identifying the external software module.

17. The method according to claim 13, wherein the interrupt is executable after complete loading of the external software module by the operating system kernel.

18. The method according to claim 13, wherein the external software module comprises a plurality of sections, the method further comprising modifying the operating system to store, in the predetermined variable, memory addresses and identifiers for each section of the external software module.

19. The method according to claim 18, wherein the predetermined variable comprises a table within the program memory.

20. The method according to claim 18, wherein retrieving the allocated memory address and the identifier from the program memory comprises retrieving the memory addresses and identifiers for each section of the external software module; and wherein retrieving the binary code of the first section stored comprises retrieving binary code for each section of the external software module.

21. The method according to claim 13, further comprising executing a continuation instruction after outputting the binary code and the associated symbol file to allow the operating system to resume running.

22. The method according to claim 13, further comprising debugging the external software module using the binary code and the associated symbol file from the debugging tool.

23. The method according to claim 13, wherein the operating system comprises a Linux operating system.

24. The method according to claim 13, wherein generating the interrupt instruction occurs before initiating the loading sequence, and wherein the first section comprises an initialization function.

25. The method according to claim 24, wherein:

the loading sequence is unsuccessful; and the method further comprises outputting, by the debugging tool, at least one of the binary code or the associated symbol file for the initialization function.

* * * * *